(12) United States Patent
Miller et al.

(10) Patent No.: US 8,379,021 B1
(45) Date of Patent: Feb. 19, 2013

(54) SYSTEM AND METHODS FOR RENDERING HEIGHT-FIELD IMAGES WITH HARD AND SOFT SHADOWS

(75) Inventors: Gavin S. P. Miller, Los Altos, CA (US); Nathan A. Carr, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1127 days.

(21) Appl. No.: 12/177,717

(22) Filed: Jul. 22, 2008

Related U.S. Application Data

(60) Provisional application No. 61/024,639, filed on Jan. 30, 2008.

(51) Int. Cl.
*G06T 15/60* (2006.01)
(52) U.S. Cl. ........................................ 345/426
(58) Field of Classification Search .................. 345/426
See application file for complete search history.

(56) References Cited

U.S. PATENT DOCUMENTS

| 5,299,298 | A * | 3/1994 | Elmquist et al. ............. 345/421 |
| 2005/0280646 | A1 | 12/2005 | Wang et al. |
| 2006/0202941 | A1 | 9/2006 | Morein |
| 2006/0262117 | A1 * | 11/2006 | Chiba ........................ 345/440 |
| 2007/0115283 | A1 | 5/2007 | Foster |
| 2009/0033661 | A1 | 2/2009 | Miller |

OTHER PUBLICATIONS

Wang et al.; "View-dependent Displacement Mapping;" ACM SIGGRAPPH 2003, Jul. 2003, pp. 334-339.*
Efficient Image-Based Methods for Rendering Soft Shadows. Maneesh Agrawala, Ravi Ramamoorthi , Alan Heirich, Laurent Moll. SIGGRAPH 2000, Jul. 2000. pp. 375-384.
Chris Green. 2007. Efficient self-shadowed radiosity normal mapping. In ACM SIGGRAPH 2007 courses (SIGGRAPH '07). ACM, New York, NY, USA, 1-8.
Natalya Tatarchuk. 2006. Dynamic parallax occlusion mapping with approximate soft shadows. In Proceedings of the 2006 symposium on Interactive 3D graphics and games (I3D '06). ACM, New York, NY, USA, 63-69.
Soft Shadows by Ray Tracing Multilayer Transparent Shadow Maps by Feng Xie , Eric Tabellion , Andrew Pearce. Eurographics Symposium on Rendering (Jul. 2007). Proceedings of the Eurographics Symposium on Rendering Techniques, Grenoble, France, 2007. Eurographics Association 2007. pp. 265-276.

* cited by examiner

*Primary Examiner* — Edward Martello
(74) *Attorney, Agent, or Firm* — Wolfe-SBMC

(57) ABSTRACT

A system, methods, and computer-readable storage media for rendering height-field images that efficiently compute hard and soft shadows are disclosed. The system and methods may utilize a graphics representation comprising bounded 2D shapes with full 3D fill styles that affect shading, and an occlusion priority that determines visibility. The methods may include scan-coherent techniques for computing shadows from height-fields containing depth discontinuities while incrementally updating a convex hull of surface points. The methods may include a sweep-based algorithm for linear light source illumination of 2.5D graphical models across diagonal height-field cross-sections and/or a shear warp algorithm. Pre-computed (weighted) integrals corresponding to the light direction may be stored in tables according to a corresponding horizon angle and may be used in computing the lit intensity. The results may be free of aliasing artifacts. The methods may be implemented as program instructions, stored on computer-readable media, executable by a CPU and/or GPU.

40 Claims, 12 Drawing Sheets

SYSTEM AND METHODS FOR RENDERING HEIGHT-FIELD IMAGES WITH HARD AND SOFT SHADOWS

PRIORITY INFORMATION

This application claims benefit of priority to U.S. Provisional Application No. 61/024,639, filed Jan. 30, 2008, which is herein incorporated by reference in its entirety.

BACKGROUND

Description of the Related Art

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

A GPU may include various built-in and configurable structures for rendering digital images to an imaging device. Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, curves, and text characters) may be based upon mathematical equations to represent parts of vector graphics data in digital images. The geometric objects may typically be located in two-dimensional or three-dimensional space. To render vector graphics on raster-based imaging devices (e.g., most display devices and printers), the geometric objects are typically converted to raster graphics data in a process called rasterization.

Graphical data may often be expressed in a structured format that complies with a particular specification or model for representing such data. Instead of requiring application programs to describe every page as a full-resolution pixel array, a high-level imaging model may enable applications to describe the appearance of pages containing text, graphical shapes, and sampled images in terms of abstract graphical elements rather than directly in terms of device pixels. Such specifications and models may often be implemented across multiple computing platforms to facilitate the exchange of graphical data. The Adobe® PostScript® language, Adobe® Portable Document Format, and Adobe® Imaging Model, for example, include various structures and commands to describe complex two-dimensional graphical data including geometric models and bitmapped images.

Rendering 3D graphics with sophisticated lighting effects, such as area light sources, may be computationally complex and expensive. For example, previous techniques that could solve the rendering aspect of the system include ray-tracing and multi-pass rasterization for large numbers of individual light sources. However, ray-tracing requires a large number of rays to achieve quality soft shadows, and rasterization methods require constructive solid geometry (CSG) and many passes to achieve reasonable shading effects.

SUMMARY

Various embodiments of systems, methods, and computer-readable storage media for rendering height-field images that efficiently compute hard and soft shadows are disclosed. In some embodiments, the methods may include scan-coherent techniques for computing hard and soft shadows from height-fields that contain depth discontinuities. The results may be computed efficiently and may be free of aliasing artifacts. In some embodiments, an extension of 2D occlusion priority models to 2.5D shading and rendering may create a novel hybrid of graphic design concepts with sophisticated lighting effects. For example, in some embodiments a graphics representation consisting of bounded 2D shapes with priority-based occlusion and/or full 3D fill styles, may be employed. The fill-styles may affect shading and shadows, and the occlusion priority may determine visibility.

The methods may in some embodiments include techniques for computing shadows while incrementally updating a convex hull of surface points. The methods may include a sweep-based algorithm for linear light source illumination of 2.5D graphical models across diagonal height-field cross-sections and/or a shear warp algorithm. In some embodiments, pre-computed (weighted) integrals corresponding to various components of the light direction may be stored in tables according to a corresponding horizon angle and may be used in computing the lit intensity. The results may be free of aliasing artifacts.

The methods described herein may be implemented as program instructions, (e.g., stored on computer-readable storage media) executable by a CPU and/or GPU. Such methods may allow faster rendering of images having depth than traditional methods and may facilitate a simpler 2D workflow for design content with a 3D look.

Figure 1:
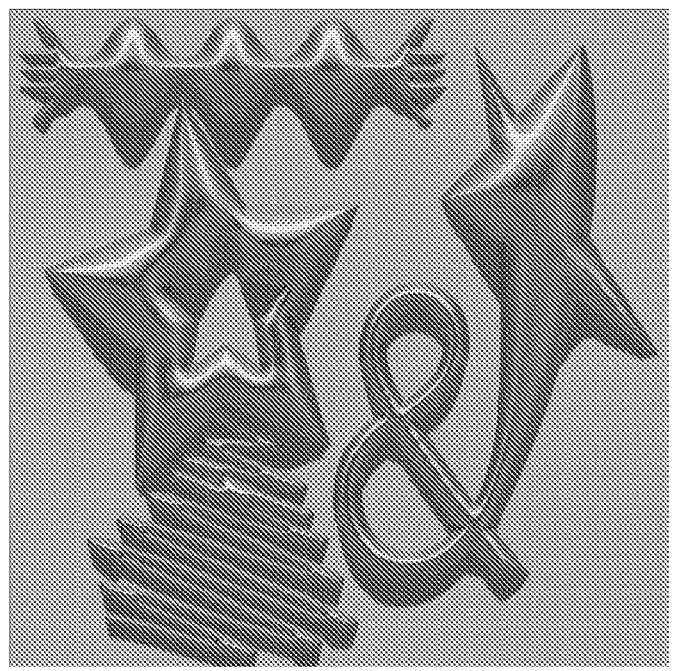
FIG. 1 illustrates the effects of self-shadowing for a non-planar graphic design illuminated by a point light source, according to one embodiment.

Specific embodiments are shown by way of example in the drawings and are herein described in detail. It should be understood, however, that drawings and detailed description thereto are not intended to limit embodiments to the particular forms disclosed, but on the contrary, the intention is to cover all modifications, equivalents and alternatives falling within the spirit and scope as defined by the appended claims.

DETAILED DESCRIPTION OF EMBODIMENTS

Various embodiments of systems and methods for implementing scan-coherent techniques for computing hard and soft shadows from height-fields that contain depth discontinuities are disclosed. The results may be computed efficiently and may be free of aliasing artifacts. Various embodiments may include an extension of 2D occlusion priority models to 2.5D shading and rendering, which may create a novel hybrid of graphic design concepts with sophisticated lighting effects.

Previous techniques used for rendering height-field images include ray-tracing and multi-pass rasterization for large numbers of individual light sources. However, neither technique supports a straightforward implementation of the occlusion model, and neither would be very efficient at final rendering if they included such a model. For example ray-tracing would require a large number of rays to achieve equivalent quality soft shadows, and rasterization methods would require constructive solid geometry (CSG) techniques and many passes to achieve equivalent shading effects.

The system and methods disclosed herein may support rendering of height-fields and 2.5D imaging models that include the concept of depth for each surface. A height-field may be characterized as a surface whose depth is defined uniquely at each (X, Y) position. Height-fields may in some embodiments be characterized as height maps when the height varies with position. Some embodiments may include techniques for rendering height maps with self-shadowing for both hard and soft shadows, as described herein. In some embodiments, methods for computing soft shadows on a surface may involve computing a weighted integral over the visible portion of a light source from each surface point. The methods described herein may include a rapid way to account for occlusion of the light source by other portions of the surface and also fast methods to compute the properly weighted integrals over the visible portion of the light.

The basic techniques described herein may in some embodiments be extended to work on height-fields made up of bounded shapes with sharp depth discontinuities at the boundaries. Such an extension may in some embodiments be useful when working with imaging models that are a generalization of traditional 2D imaging models (such as is found in Flash® and the Adobe® Graphics Model). In some embodiments, a shape priority may be used to define occlusion order (similar to a sorted layer model), but within the 2D boundaries of a shape, the surface depth may determine self-shadowing and inter-object shadowing. By decoupling visibility priority from surface depth, a form of solid modeling may be created that enables a variety of carving effects of one shape out of another.

Traditional 2D graphics models have used planar geometry to convey shape and content. Because of the ability to perform significant shading computations at each pixel, some may consider extending such models to include some 3D characteristics. These may take the form of full 3D models, but may present challenges for authoring. In some embodiments, a middle ground may involve a 2.5D modeling technique in which a surface is viewed in orthographic projection along the Z-axis, but the surface at each pixel location includes a depth and normal that may not be planar. In such embodiments, the normal variation may enable interesting shading effects once the notion of a light source is introduced. However, as with 3D rendering, the computation of correct shadows caused by one portion of the surface blocking the light from another may require non-local computations. An example of the effects of self-shadowing for a non-planar graphic design illuminated by a point light source is illustrated in FIG. 1. In this example, a self-shadowing 2.5D graphic is lit by a distant point light.

Figure 2:
FIG. 2 illustrates the effects of shadowing for a non-planar graphic design illuminated by an environment-mapped area light, according to one embodiment.

In another example, an environment-mapped area light may be used to generate the lighting, rather than a point light. In some embodiments, this environment-mapped area light may be thought of as the sum of the result of shading with a large number of individual lights (e.g., distributed over a hemisphere) of varying intensities. FIG. 2 illustrates an example of a 2.5D graphic illuminated by such an environment-mapped area light. A direct computation of such a light, however, may be very computationally expensive using traditional techniques. In some embodiments, the methods described herein may include faster techniques for solving such problems, as described in more detail below.

The systems and methods for rendering height-field images disclosed herein are first described in terms of basic height-field rendering with distant point light sources resulting in hard shadows, according to various embodiments. Following these basic techniques is a detailed description of how, in some embodiments, they may be used efficiently for linear light source shading and, through summation, area light sources. An imaging model with bounded height-fields with depth discontinuities is also described herein, including a detailed description of how in some embodiments the algorithm may be extended to that case. Finally, various re-sampling strategies for light-coherent rasterization are described, which in some embodiments may include a shear-warp optimization for parallel illumination and radial sweeps for local point light sources.

Note that the techniques described herein may in some embodiments be applicable to a special case of 3D imaging, a case in which image(s) appear as if carved out of a piece of stone. In other words, everything in the image(s) is extruded from the background out, or cut into the background as a hole. In the cases to which the techniques may be applied, some surfaces are closer than others (i.e., they may be described by a height field) and surfaces do not circle back on themselves (i.e., there are no "caves"). In other embodiments, the techniques may be extended to support detached objects floating in space.

The techniques described herein may in various embodiments be applied in any situation in which 2D vector art is used to add a more realistic 3D look to the art. They may be applied in a 2D design workflow, rather than requiring a full 3D system, but may provide 3D shaded-looking output. For example, in some embodiments, the techniques may be applied within Adobe® Illustrator® or Flash® to make shaded graphics. Note that in prior art 2D work, priority order of 2D boundary curves may be used to determine a fill color. In some embodiments, the techniques described may instead determine the depth within 2D art work based on the priority. For example, if one shape is within another shape, but has a higher priority, it will cut a hole in the other shape rather than being hidden by it, even if the depths indicate that it is further away.

In some embodiments, the method may include an algorithm that follows a diagonal line of light across an image diagonally, computing bilinear texture splats for each pixel. In other embodiments, a shear warp algorithm may be applied so that the light direction is horizontal along a scan line. In such embodiments, a shear warp may be applied to the output of the algorithm at the end to account for the light going in a diagonal direction. The second algorithm may in some embodiments be on the order of two times faster than the first, and may exhibit fewer artifacts than the first.

In some embodiments, input 2D vector art may include 2D boundary shapes with analytic curves on the boundaries. In some embodiments, a shape may include a function that indicates the surface normal and depth at each interior point, which may be used in rasterizing the corresponding image (e.g., by invoking "what depth" or "what surface normal" functions to return the depth and/or surface normal, respectively). In one embodiment, a function may be used to determine where a scan line intersects the boundary of the shape (e.g., at each end). Between these two points (including fractionally at the intersections), the "what depth" and/or "what surface normal" functions may be called and the information returned may be passed to a shader to adjust the color for each pixel. In some embodiments, the shader may be configured to adjust the color for various pixels so that the resulting image has anti-aliased edges. For example, in various embodiments, the shader may apply an arbitrary "material" to the image and put the resulting color in each pixel. At each end of a boundary line (e.g., at the intersections between the boundary line and a scan line), where fractions of pixels may be covered, the shader may add the appropriate color multiplied by the fraction of pixel to produce anti-aliased edges. In some embodiments, the method may include applying a higher resolution pass (e.g., a 4× resolution pass) vertically and then filtering the results down to get anti-aliasing in the other direction. Other resolutions may be applied in various embodiments. In some embodiments, the method may resemble a 2D vector scan conversion code, in which an inner loop computes shadow and shading at each point.

Height-Field Rendering with Self-Shadowing for Point Light Sources

A useful observation for height-field shadow computations is that self-shadowing occurs in a plane that is vertical through the height-field and parallel to the direction of the light (for a distant light source), where vertical is the direction along which the height-field is singly valued. By convention for this document, that direction is aligned with Z.

Figure 3:
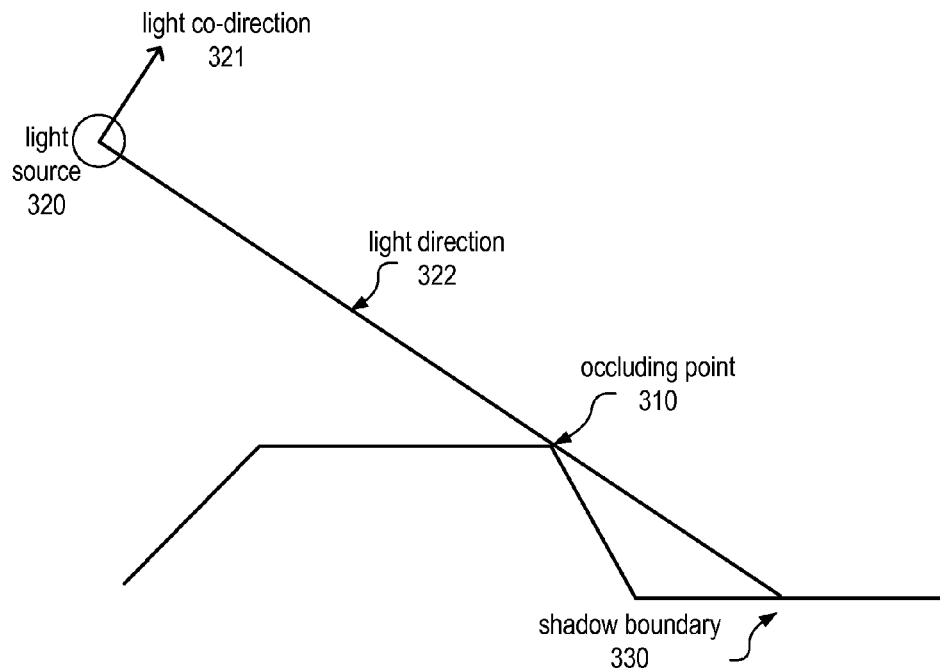
FIG. 3 illustrates a planar self-shadowing property, according to one embodiment.

An example of this planar self-shadowing property is illustrated in FIG. 3, which illustrates hard shadows from point light sources for a height-field cross-section. In this example, peaks closer to the light source cast shadows onto further-away portions of the height-field. For example, points to the left of shadow boundary 330 will be shaded from light source 320, according to occluding point 310. For this reason, it may be useful to formulate rendering algorithms in such a plane. In the case of 2.5D imaging models, such planes may be represented as diagonal lines in the image plane, since the surface is viewed along the "vertical" direction of the height-field.

One prior art technique for self-shadowing involves computing a light co-direction that is in the plane of the height-field cross-section and orthogonal to the light direction. Using this technique, while sweeping along the horizontal axis in the direction away from the light source, each new depth sample is used to compute a dot product with the light co-direction. If this value is less than the previous maximum value for the dot product for already-rendered points, then the new surface point is in shadow. If the dot product of the new point is greater than all previous values, then the point is illuminated and the max-dot-product is set to the dot product value of the new point. This algorithm assumes that the cross-section data is along a diagonal line in the 2D plane view, herein called a scan-vector. Scan-lines, by contrast, are aligned with the horizontal axis of the output image, in this algorithm.

In various embodiments, the system and methods described herein include sweeping along a surface in the light direction(s), rather than along scan line, as the image is rendered. The method may include mechanisms to keep track of geometry along the light directions that has been encountered as the sweep progresses. If a convex hull is used to track geometry, for example, the following question may be answered using the convex hull data, "What fraction of the sky can be seen from a given point looking back along the scan line?" The convex hull may provide an angle (i.e., the elevation of the horizon) to indicate what fraction of a light source can be seen. This information may then be used to compute the amount (i.e., the intensity) of light that would hit the surface at that point. Note that, as used herein, the term "elevation" refers to the measure of an angle of a line going from one point to a second point relative to the horizon. This may also be thought of as the elevation angle of a given point as observed from a second point. The term "elevation" is never used herein to refer to linear height, but is always used to refer to an angle.

In some embodiments, the techniques described herein may be applied in a single pass, given a linear light source. In such embodiments, the techniques may be used to produce soft-edged shadows, rather than hard-edged ones. Such soft-edged shadows may be well suited for representing the effect of a linear light source on a carved-out image.

In some embodiments, for an arbitrary variation of light vertically between the horizon and straight up (such as that found on an overcast day or when using an environment map, large area light source, or several light sources), the method may include pre-computing an integral along the angle, storing this in a table for lookup, and then doing a table lookup (given the horizon angle) to determine the amount of light falling on the surface. For example, a pre-computed (weighted) environment integral may involve factoring the light direction into sin and cos terms, putting them in a table, and having a formula for combining them for a given angle, as described in more detail below. Such pre-computing may not be possible in 3D (e.g., analytically), but may be done in 2D cross-sections, as described herein. In some embodiments, the use of such pre-computed integrals saves computation time and/or costs because without them, the method may need to loop through each term in the texture, figuring out all the contributions. In some embodiments that employ such pre-computed integrals, the lit intensity from area lights and/or lights from environment maps may be computed as cheaply as that from a single point light.

In some embodiments, for an area light source, rather than a linear sweep, the method may include a series of sweeps along different radial light directions whose results are added together. In some embodiments, this may be used to light a scene with an entire environment map, rather than with just a single light source, as illustrated in FIG. 2. In embodiments, in which the techniques described herein are applied to the special cases described above, this method may be 5-10 times faster than if a prior art ray tracing technique is applied to the same images. As described above, during rasterization, because nothing overlaps, fractional distances within a pixel may be used to do anti-aliasing at the edges, and the result may include desirable anti-aliasing properties. Note that in some embodiments, fractional anti-aliasing might be done in 2D first on one axis and then on the other.

Also note that, when illumination of an image is from an environment map rather than single light source, if there is an even number of sweep directions, each scan line may go back in the direction opposite that of another of the scan lines. For example, when sweeping along a scan line from the top left to the bottom right, there will also be one scan line sweeping from the bottom right to the top left that captures the opposite segment of the environment map. In some embodiments, the method may amortize the scan conversion and share those samples, taking advantage of the opposite sweep. The use of such bidirectional sweeps may in some embodiments add to the efficiency of the described framework.

To compute an image such as that illustrated FIG. 1, the diagonal-span-vectors may be converted into a rectilinear image. This may be done by adding a kernel, (such as a small Gaussian or bilinear splat) into an array of values for each color channel, provided that the kernel is scaled by the shading value for the given color channel. If a low sampling rate is used for the splats (e.g., using a rate at or above one splat per output pixel), then jagged shadows can result. One approach to avoid such jagged shadows is to use the value of the co-direction dot product to ramp between occluded and unoccluded shading values based on a depth range. This can lead to slightly soft shadows, such as in those illustrated in FIG. 1, which may be acceptable for some applications. True soft shadows, however, may depend on the fraction of a linear or area light source that is occluded by previous geometry. Efficient techniques for computing correct soft shadows for linear light sources are outlined below.

Computing Horizon Elevations

While hard shadows such as those shown in FIG. 1 may provide important cues about surface geometry, soft shadows may also be used. Soft shadows may occur when a light source subtends a significant solid angle from the region being lit, some of which may be occluded by other geometry. Geometry for a height-field with a linear light is illustrated by way of example in cross-section in FIG. 4. In this example, soft shadows from linear light source 420 for a height-field cross-section are illustrated. In this example, the angular extent of the linear light source 420 defines three cases of shadowing. In the case of points in the cross-section between the occluding point 410 and surface point 431, the surface is completely shadowed. This is called the umbra region. In the area between surface point 431 and surface point 432, in this example, at least part of the light source is occluded. This region is called the penumbra. To the right of surface point 432, in this example, the surface is fully lit.

To compute the amount of light falling on a given surface point, it may be necessary to find the horizon point from a given surface position. Using the example illustrated in FIG. 4, points close to and between surface point 431 and surface point 432 have the same horizon point, which is labeled as the occluding point 410.

In some embodiments, the algorithm represented by the pseudo-code below may be used to find the horizon point. Note that in this example, h(X) represents the elevation of point X.

Given a point X in a light-aligned cross section
maxElevation=$-\pi/2$
For each point X[i] in a light-aligned cross-section
{
For each point X' closer to the light than X[i]
{
  elevation=a tan((h(X')−h(X))/(X−X'))
  If (elevation>maxElevation)
    maxElevation=elevation
}
}

Pseudo-code 1: Method for computing previous point of maximum elevation

In some embodiments, the pseudo-code illustrated above may have a computation cost that is quadratic in the number of points along the scan-line. In some embodiments, in order to implement an algorithm that is less than quadratic in performance, incremental results from previous points $X_i$ may be used when computing the result for $X_{i+1}$. An important observation is that the horizon point for a given $X_i$ will lie on the convex hull of the points 0 to i−1. One embodiment of a more efficient algorithm for computing maximum elevation, i.e., one that takes advantages of this observation, is represented by the pseudo-code below. In this example, it is assumed that X[i] are at monotonically increasing distances away from the light source on the cross-section. In this example, there is no requirement that these points are spaced evenly apart from each other. In other embodiments, such a requirement may be applicable.

Initialize convexHull to an empty set
For each point X[i] in a light-aligned cross-section
{
elevation[i]=Maximum elevation for previous points in convexHull
If X[i] is on the convex hull, then
  incrementally update convexHull with point X[i]
}

Pseudo-code 2: Overview of incremental max-elevation algorithm

In this example, the pseudo-code illustrated above (labeled Pseudo-code 2) replaces a search over previous points in the scan-line (such as that illustrated in Pseudo-code 1) with a search over the convex hull of the previous points in the scan-line. Note that in the case where the previous points were all on the convex hull, there may appear to be no improvement over Pseudo-code 1. However, in other embodiments, if the convex hull is updated incrementally, the small incremental changes that typically happen as a point is added or removed from the convex hull may be exploited.

Figure 5:
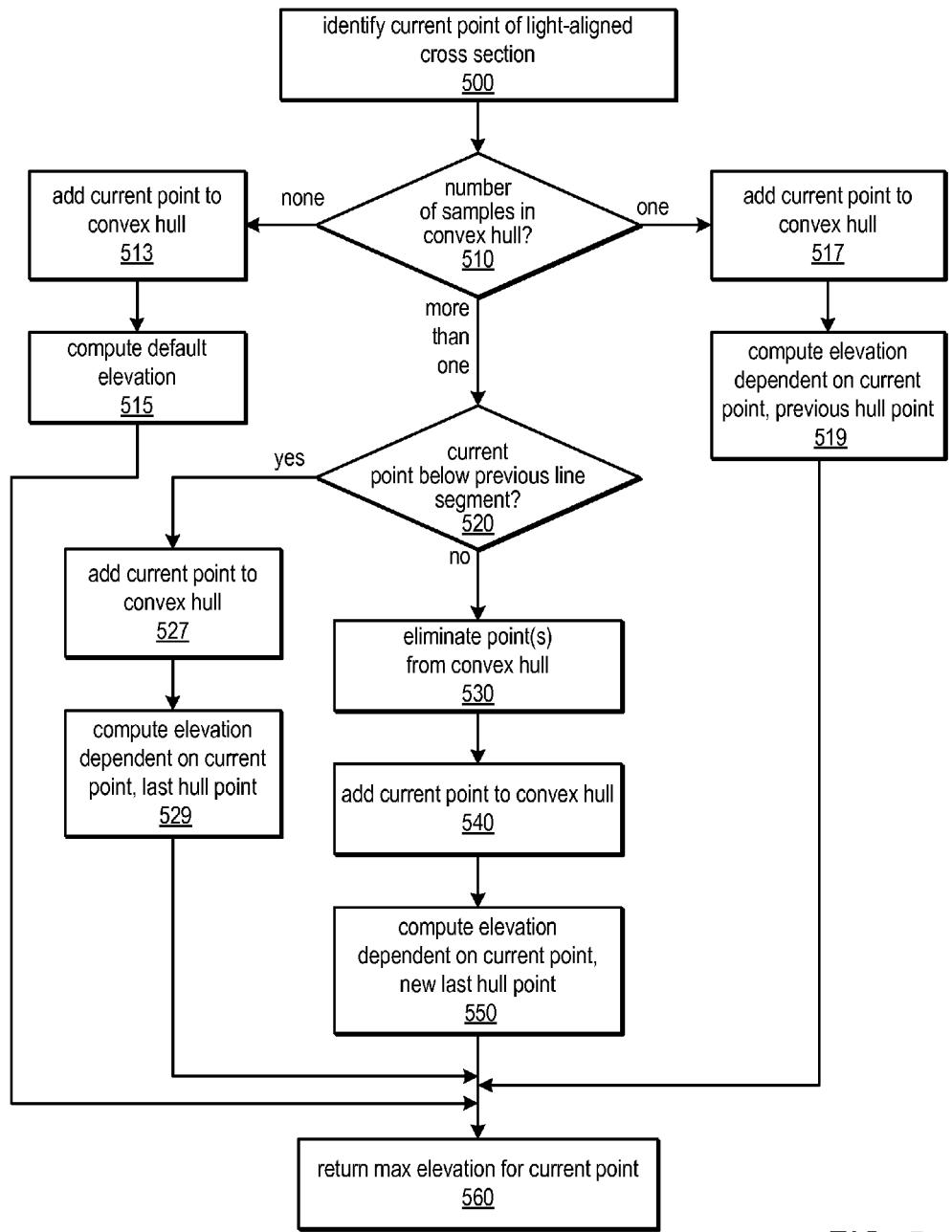
FIG. 5 is a flow diagram illustrating a method for determining maximum elevation from a given surface point, according to one embodiment.

One method for computing the point of maximum elevation from a given surface point using an incremental convex hull is illustrated by the flow diagram in FIG. 5. In this example, a given surface point of light-aligned cross-section is identified as the current point, as in 500. If this is the first surface point being considered, there will be no samples in the convex hull yet. This is shown as the "none" exit from decision block 510. In this case, the current point may be added to the convex hull, as in 513, and the point of maximum elevation from the surface point may be computed as a default value dependent on the current point only, as in 515. If the current surface point is the second surface point to be considered, shown as the "one" exit from decision block 510, the current point may be added to the convex hull, as in 517, and the point of maximum elevation from the current surface point may be computed dependent on the current point and the previous convex hull point, as in 519.

If there are two or more previous samples in the convex hull, shown as the "more than one" exit from decision block 510, the method may include determining if the current point is below the previous line segment (e.g., the line segment whose end points are the two most recently added samples in the convex hull, or the line segment whose endpoints are two spatially adjacent points with respect to the direction back toward the light source), as in 520. If so, shown as the positive exit from decision block 520, the method may include adding the current surface point to the convex hull, as in 527, and computing the point of maximum elevation from the current surface point dependent on the current point and the most recently added previous convex hull point, as in 529.

If, on the other hand, the current point is not below the previous line segment, shown as the negative exit from decision block 520, the method may include eliminating one or more points from the convex hull, as in 530. For example, the method may include stepping back through the points on the convex hull as long as the elevation of points is increasing. Each point visited may be removed from the convex hull if its previous point is of higher elevation. The method may then continue as before, by adding the current surface point to the convex hull (as in 540), and computing the point of maximum elevation from the current surface point dependent on the current point and a spatially adjacent point (i.e., a point spatially adjacent to the current point in the direction back toward the light source) now in the convex hull (as in 550). Note that in this case, this spatially adjacent convex hull point might not be the last point to have been added to the convex hull, as this point (and, in some cases, additional points) may have been removed from the convex hull by the operation illustrated as 530.

Finally, the method may include returning the maximum elevation of the convex hull as computed from the current surface point, as in 560. Note that the operations illustrated in FIG. 5 may in some embodiments be repeated for each surface point in a light-aligned cross-section to determine the maximum elevation for each of these surface points (not shown). In some embodiments, these values may then be used in determining an amount of light falling on the surface from the light source, as described in more detail herein.

The method illustrated in FIG. 5 may be described in more detail by way of example Pseudo-code 3, found below.

---

Pseudo-code 3: An incremental convex hull algorithm

```
convexHull.clear( )
For each point X[i] in a light-aligned cross-section
{
    // Includes adding point to convex hull
```
---

-continued

Pseudo-code 3: An incremental convex hull algorithm

```
    elevation[i] = MaximumElevationAndAddPoint(X[i]);
}
End
real MaximumElevationAndAddPoint(currentPoint)
{
samples = convexHull.numPoints;
    if (samples == 0)
    {
        // Add current point to the convex hull
        convexHull.push_back(currentPoint);
        elevation = −π/2
    }
    else if (samples == 1)
    {
        // Add Hull Point currentPoint
        elevation = ElevationOfPoint(convexHull[0], currentPoint);
        convexHull.push_back(currentPoint); // Append to convex hull
    }
    else
    {
        // Look back to see if the new point is
        // below the previous line segment
        if (PointBelowLineHorizontal(convexHull[samples − 2],
            currentPoint, convexHull[samples − 1]) == false)
        {
            // The last point is on the horizon of the current point
            elevation = ElevationOfPoint(convexHull[numHullSamples − 1],
                currentPoint);
            convexHull.push_back(currentPoint); // Append to convex hull
        }
        else
        {
            // March backwards eliminating points
            // below the line to the new point
            bool searching = true;
            while(searching && samples > 1)
            {
                if (PointBelowLine (convexHull[numHullSamples − 2],
                    currentPoint, convexHull.point[samples − 1]))
                {
                    convexHull.pop_back( ); // Remove last on the list
                    samples = samples − 1;
                }
                else
                {
                    searching = false;
                }
            }
            elevation = ElevationOfPoint(convexHull[samples − 1],
                currentPoint);
            // Add Hull Point currentPoint
            convexHull.push_back(currentPoint); // Append to convex hull
        }
    }
    return elevation;
}
```

---

The algorithm represented by Pseudo-code 3, above, may in some embodiments execute in a constant time per sample, since changes to the convex hull may often involve the addition or removal of a single point for each new sample.

In some cases, the light direction for an image may be more aligned with the x-axis than the y-axis. In such cases, an implementation of a PointBelowLine technique may be appropriate. An example of such a technique is illustrated below in Pseudo-code 4. Note that in some embodiments, the exact function may depend on the sign of the direction of the light direction relative to the closest axis direction (e.g., expressed as a Boolean flip-sign operation). Note also that to determine whether a point is below a line, in some embodiments a ratio may be compared to another ratio, but may be rearranged to avoid a division.

Pseudo-code 4: Method to determine whether a point
is below two ends of a line

```
bool PointBelowLine (float3 end1, float3 end2, float3 point, bool flipSign)
{
  if (flipSign)
  {
    if (point.x <= end2.x)
    {
      return point.z < end2.z;
    }
    if (end1.x <= end2.x)
    {
      return false;
    }
  }
  else
  {
    if (point.x >= end2.x)
    {
      return point.z < end2.z;
    }
    if (end1.x >= end2.x)
    {
      return false;
    }
  }
  if ((end2.z - end1.z) • fabs(point.x - end1.x) >=
      (point.z - end1.z) • fabs(end2.x - end1.x))
    return true;
  return false;
}
```

Height-Field Rendering with Self-Shadowing for Linear Light Sources

Various embodiments of a method for computing the elevation of the horizon for the portion of a cross-section that is close to a light source have been described above. In some embodiments, the methods described below may be used to compute the lit intensity of a surface illuminated by the light source.

The energy contribution for a patch of a light source that subtends a solid angle at the surface patch may be given by:

$$\Delta E = R(N \cdot L)\Delta\Omega$$

In this equation, E represents the irradiance of the surface patch, R represents the radiance of the light at the surface, N is a unit length vector that represents the surface normal, L represents a unit length vector towards the light source patch, and $\Delta\Omega$ represents the solid angle of the light source patch when viewed from the surface point.

If it is assumed that the light sources are at infinity, then L becomes constant for a given light source patch. If it is assumed that a linear light has a constant value of $\phi$ (i.e., the light is a vertical strip), then the intensity computation may in some embodiments be expressed as follows:

$$E = \int_{\theta min}^{\pi/2} R(N \cdot L) w(\theta) d\theta \qquad (1)$$

In this equation, the value of $\theta_{min}$ may be determined by the occlusions from the previous geometry in the scan-line, i.e., $\theta_{min}$ may represent the elevation of the horizon when looking back towards the linear light. In the case of a constant angular width light source, the angular width $w(\theta)$ may be considered to be a constant w. In the case in which a segment of a background environment is represented, then $$w(\theta) = \Delta\phi \cos(\theta)$$

In some embodiments, the light direction may be expressed as a combination of the cross-section sweep direction and the vertical direction:

$$L = Z\cos(\theta) + S\sin(\theta)$$

In the equation above, Z represents the vertical direction, and S represents the sweep direction (horizontal in the cross-section). In this case, Equation (1), above, becomes Equation 2:

$$E = (N \cdot Z)\int_{\theta min}^{\pi/2} R\cos(\theta)w(\theta) d(\theta) + (N \cdot S)\int_{\theta min}^{\pi/2} R\sin(\theta)w(\theta) d(\theta) \qquad (2)$$

In some embodiments, the radiance R of the light patches may depend on angular position $(\phi, \theta)$ within the light. In the case of an "environment light", an environment map may be used to modulate the radiance within a linear light source. However, it is worth noting that in some embodiments the integrals in Equation 2 may be pre-computed and stored in tables to represent functions that only depend on $\theta_{min}$, as shown in Equation 3.

$$E = (N \cdot Z)I_Z(\theta_{min}) + (N \cdot S)I_S(\theta_{min}) \qquad (3)$$

For a diffuse surface, the brightness of the surface may be linearly proportional to the irradiance. Therefore, in some embodiments, Equation 3 may be used to evaluate a pixel contribution from a given linear light provided that the normal and $\theta_{min}$ values are available to the shader.

As noted above, the image illustrated in FIG. 2 may be created using a set of linear lights modulated by an environment map (e.g., the same environment map used for the metallic reflections), with each linear light representing different segments of the environment map. In some embodiments, the contributions for each of these lights may be accumulated additively into a buffer to compute the final total intensity for a surface patch. Since the height-field contains no depth discontinuities and relatively shallow slopes (e.g., up to 60 degrees), a relatively small number of linear lights may be used to create accurate soft shadows, in this example. In the example illustrated in FIG. 2, approximately thirty-two linear lights proved effective to create artifact-free soft shadows for the environment map at approximately 1 frame per second on a four-core Xeon desktop computer at 2.4 GHz at 1024×1024 pixel resolution.

In the example illustrated in FIG. 2, the effects due to the lighting may be primarily visible in the shading of the background. In some embodiments, the height-field itself may be shaded using a combination of environment mapping and diffuse shading to portray slightly rough metal. In the example illustrated in FIG. 2, the depth of the height map was also used to create a blend factor or alpha to enable the metallic area to be composited over the background area. In some embodiments, such an approach may be especially well suited for single foreground objects.

One embodiment of the basic height-field rendering method described above is illustrated in FIG. 6. In this example, the method includes determining a point of maximum elevation from a given position of a surface, as in 910. In various embodiments this determination may be performed using any of the methods described herein for determining a horizon point, or using other methods. For example, in some embodiments, this determination may include searching points over previous points in a scan-line that includes the given surface position or searching points over a convex hull of previous points in a scan-line that includes the given surface position.

Figure 6:
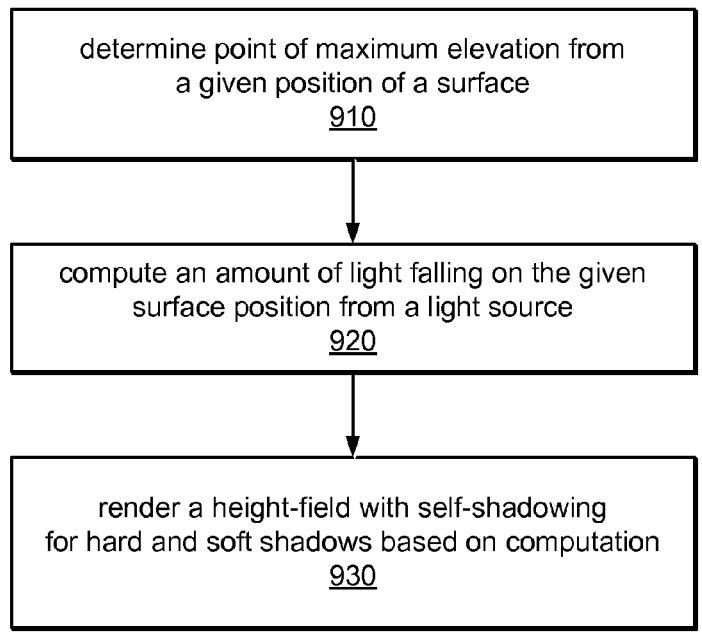
FIG. 6 is a flow diagram illustrating a method for rendering a height-field with hard and soft shadows, according to one embodiment.

The method illustrated in FIG. 6 also includes computing an amount of light (i.e., the lit intensity) falling on the given surface position from a light source, as in 920. As described herein this light source may in some embodiments include a point light source, a linear light source, or a collection of light sources, such as a plurality of linear light sources modulated by an environment map. As described herein, this computation may in some embodiments include accounting for self-occlusion and/or occlusion caused by other elements of a scene. The computation may involve computing a weighted integral over a visible portion of a light source.

As illustrated in FIG. 6, the method may include rendering a height-field with self-shadowing for hard and soft shadows, as in 930. As described herein, the height-field may be rendered based on the determination of the horizon point and/or the computation of lit intensity from one or more light sources, in various embodiments. For example, in one embodiment, rendering the height-field may include re-sampling using a sweep across one or more diagonal height-field cross-sections in a direction away from and orthogonal to the light source(s).

Figure 7:
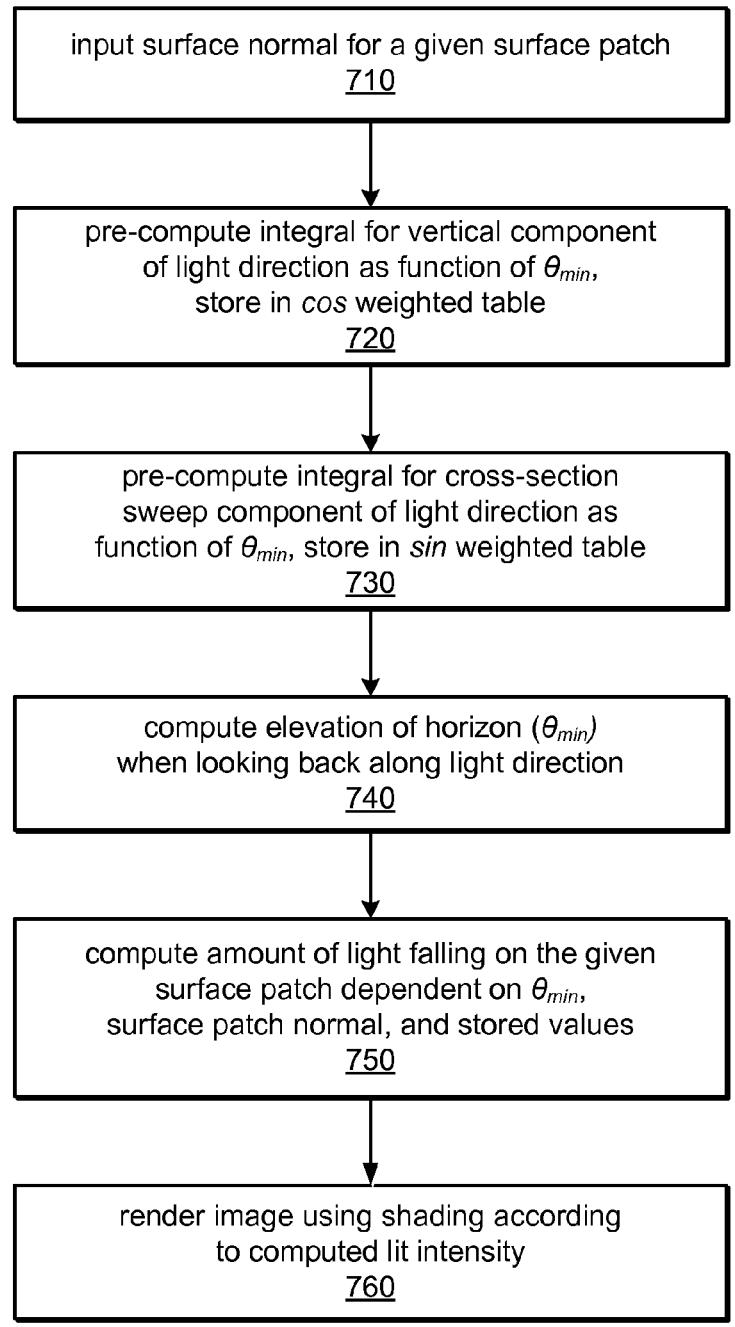
FIG. 7 is a flow diagram illustrating a method for rendering an image using pre-computed integrals for light direction components, according to one embodiment.

As described above, the integrals corresponding to the vertical light direction and the cross-section sweep light direction may be pre-computed and used in subsequent calculations to determine the lit intensity of a given portion of the surface. The flow diagram of FIG. 7 illustrates one such method, according to one embodiment. In this example, the method may receive as an input a surface normal for a given surface patch, as in 710. This surface normal will be used later to compute the light falling on the surface (as shown in 750). As shown in 720, the method may include pre-computing the integral for the vertical component of the light direction. For example, integral values may be computed as a function $I_Z(\theta_{min})$ and may be stored in a cos weighted look-up table by their corresponding $\theta_{min}$ values. Similarly, the method may include pre-computing the integral for the cross-section sweep component of the light direction, as in 730. For example, integral values may be computed as a function $I_S(\theta_{min})$ and may be stored in a sin weighted look-up table by their corresponding $\theta_{min}$ values.

In this example, the elevation of the horizon looking back along the light direction may be computed, as described herein, to determine $\theta_{min}$ for the surface patch. This is shown in 740. The amount of light falling on the surface patch (i.e., the lit intensity) may then be computed using $\theta_{min}$, the input surface normal, and the corresponding pre-computed values stored in the tables (e.g., via a table look-up operation), as in 750. In this example, an image may be rendered that includes shading according to the computed lit intensity for the given surface patch, as in 760. Note that the operations illustrated as 710-750 may be repeated for each surface patch of interest (e.g., each of a plurality of such patches making up an input image), and an image may be rendered that includes appropriate shading for each of the surface patches (not shown). In this way, an input 2D vector graphic may be rendered using shading that gives it a more realistic 3D look, in some embodiments.

The basic height-field renderer described herein may in some embodiments be extended to a more sophisticated model that can handle multiple objects with depth discontinuities. Such embodiments are described in more detail below.

An Extended Imaging Model with Scan-Coherent Rendering

The height-field renderer described above may in some embodiments be well suited for application to a limited class of graphical content. Typical 2D graphic designs may be comprised of a collection of geometric shapes with different fill styles and an occlusion ordering, which may determine which shapes are visible in areas of overlap. This is often thought of as a back-to-front drawing order in the 2D case. Conventional 3D rendering algorithms, on the other hand, may use surface depth to determine the nearest visible surface. In some embodiments, an imaging model may extend many of the characteristics of 2D occlusion-order-based region fill to the 2.5D case, with consistent shading and self-shadowing. This may be referred to as a priority-based occlusion renderer (or PBO renderer), and is described in more detail below.

Figure 8:
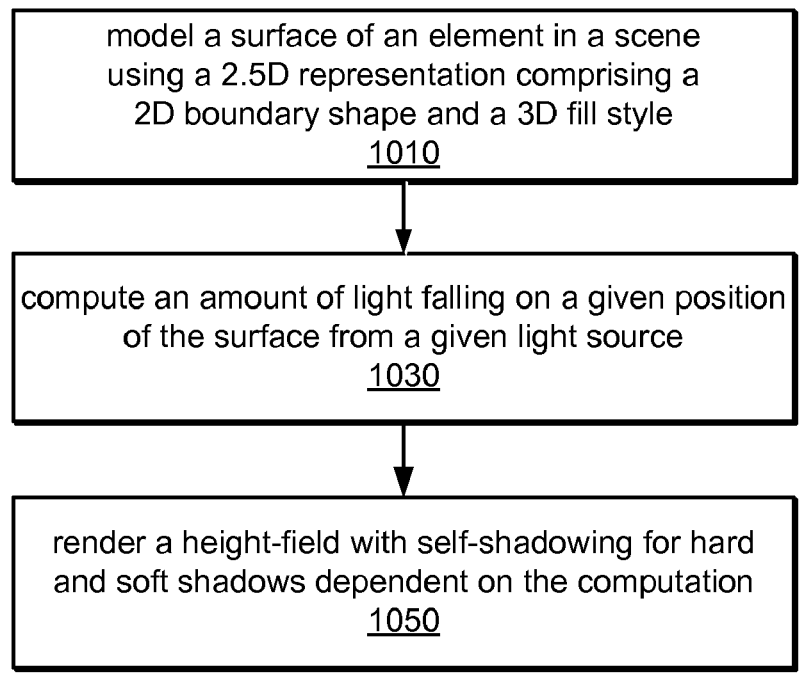
FIG. 8 is a flow diagram illustrating a method for modeling a surface and rendering a height-field thereof, according to one embodiment.

In general, a graphic design or scene-graph may consist of a collection of scene elements. A 2.5D model of a scene element may consist of a 2D boundary shape and a 3D fill style. In some embodiments, the 3D fill style may be represented by a 3D surface that determines the normal and depth of any point within the 3D boundary shape. In some embodiments, a 2.5D model may use the 2D boundary shape, along with an occlusion priority, to determine the visibility of a given surface shape, independent of the 3D depth, and may use the 3D depth to determine the casting and receipt of shadows. An extended height-field rendering method, based on such modeling, is illustrated by way of example in FIG. 8. In this example, the surface of an element in a scene may be modeled using a 2.5D model, as described above. This is illustrated as 1010. Again, the method may include computing an amount of light falling on a given position of the surface from one or more light sources, as in 1030. As described herein, this may include computing light components from one or more point light sources and/or linear or area light sources, and may account for self-occlusion and/or occlusion due to other scene elements, in some embodiments. The method may also include rendering a height-field for the given surface with self-shadowing for hard and soft shadows dependent on these computations, as in 1050.

Figure 9:
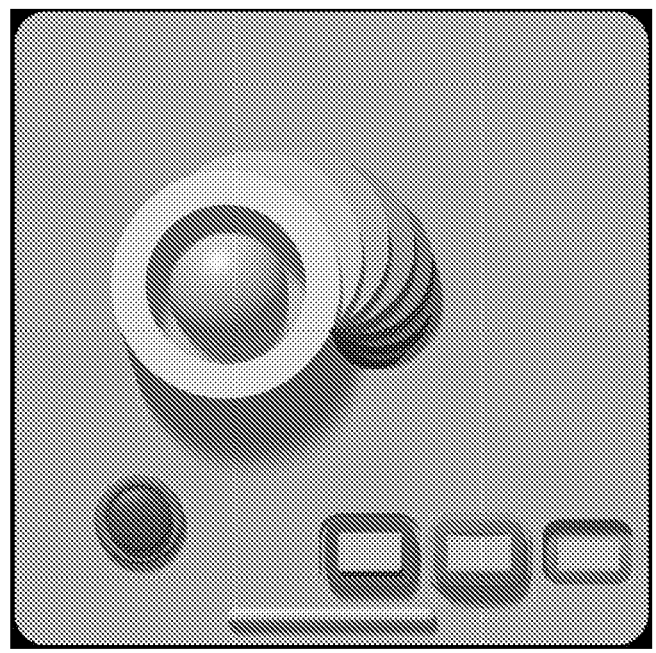
FIG. 9 illustrates an example of Priority-Based Occlusion rendering of scene elements consisting of a 2D boundary shape and a 3D fill style, according to one embodiment.

FIG. 9 illustrates an example of a priority-based occlusion rendering of a scene including disks and buttons. Note that in this example, the right-hand button is recessed behind the background. In this case, it has a higher occlusion priority but lower spatial depth than the background. Therefore, it receives shadows from the background but is not occluded by it. Rendering such an image may include making use of the cross-section coherence of self-shadowing described above. However, in some embodiments, to render such an image, the method may also need to account for occlusion discontinuities (which may include depth discontinuities) in a properly anti-aliased manner.

Figure 10:
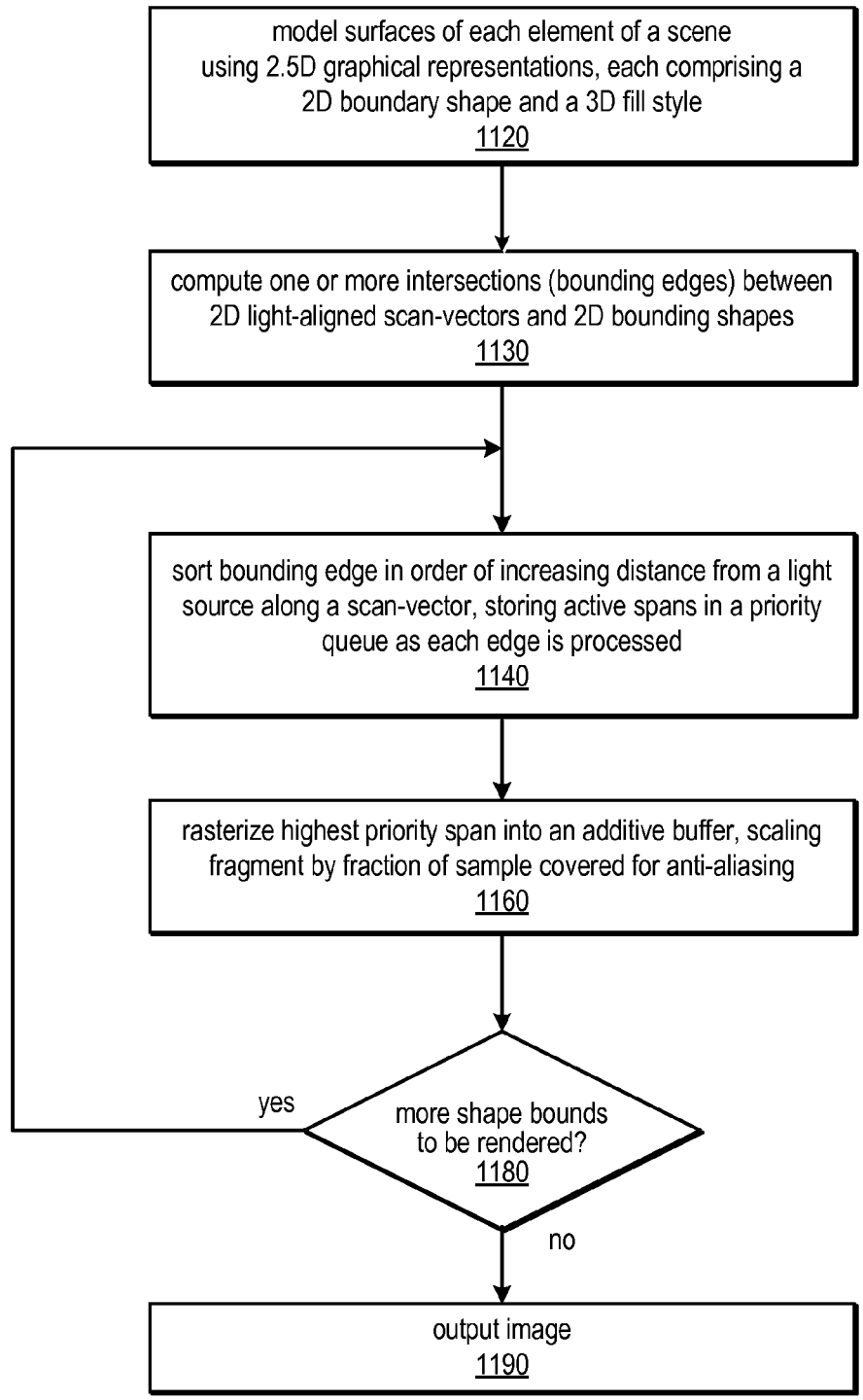
FIG. 10 is a flow diagram illustrating a method for rendering height-fields with hard and soft shadows for scenes including multiple elements, according to one embodiment.

A method for priority-based occlusion is illustrated in FIG. 10, according to one embodiment. The method for priority-based occlusion rendering may include modeling the surfaces of each element of a scene using the 2.5D graphical representations described herein, each comprising a 2D bounding shape and a 3D fill style, as in 1120. The method may work along cross-sections in planes that contain the light direction, as did the algorithm described above for computing horizon elevations. In this example, however, the method may begin by computing the intersection of 2D scan-vectors (which are light-aligned) with the 2D bounding shapes of each scene element, as in 1130. These intersections (i.e., bounding edges) may be sorted in increasing span-vector parameter order, where the coordinate increases away from the light source along the scan-vector, as in 1140.

As shown in 1140, the method may include using a priority queue to store the active spans. Initially the queue may be empty for a given scan-vector. As each 2D-boundary edge is processed, a span for that edge may be added or removed from a priority queue based on the occlusion priority of the new edge versus the existing spans in the queue. When an edge is added with a priority higher than the current span, the current span may be terminated at that location, the sample fragment may be scaled for anti-aliasing, as described below, and a call to rasterize that span may be made, as in 1160. A similar event may happen when a terminating edge is encountered. For example, it may be used to trigger a rasterization of the highest priority span, or to remove the corresponding lower priority span from the priority queue. If there are more shape bounds to be rendered, shown as the positive output of 1180, the method may include repeating the operations illustrated in 1140-1160 for the additional shape bounds. Once all shape bounds have been processed, shown as the negative exit from 1180, an image may be output, as in 1190. For example, an image representing the result of this rendering may be displayed on the screen and/or may be saved in memory for further processing (e.g., in a subsequent pass or operation).

A method for rasterizing spans (as in 1150) is described in more detail using the example pseudo-code below.

Pseudo-code 5: Algorithm for rendering spans with priority-based occlusion

```
rasterizeSpans
{
    // spanEdges stores the edge-span-vector intersection points
    // Sort the edges in spanEdges based on their coordinates
    spanEdges.sort( );
    activeEdges.clear( );
    edgeActive = false;
    activeSpanEdge = nothing;
    for (spanEdgeNext = each span in spanEdges)
    {
        if (edgeActive == false)
        {
            activeSpanEdge = spanEdgeNext;
            edgeActive = true;
        }
        else
        {
            if (spanEdgeNext.pSceneElement ==
            activeSpanEdge.pSceneElement)
            {
                // This is the trailing edge of the current active span
                Rasterize span between activeSpanEdge and spanEdgeNext;
                popping = true;
                spanEdgeSCR newActiveEdge;
                newActiveEdgeSet = false;
                while(popping)
                {
                    if (spanActiveEdges is not empty)
                    {
                        spanEdge = spanActiveEdges.top( );
                        spanActiveEdges.pop( );
                        if (activeFlags[spanEdge.activeIndex] == true)
                        {
                            newActiveEdge = spanEdge;
                            newActiveEdgeSet = true;
                            popping = false;
                        }
                    }
                    else
                    {
                        popping = false;
                    }
                }
                // If there are no more edges on the active span stack
                activeSpanEdge = newActiveEdge;
                if (newActiveEdgeSet)
                {
                    activeSpanEdge.m_coord = spanEdgeNext.m_coord;
                }
                else
                {
                    edgeActive = false;
                }
            }
```

Pseudo-code 5: Algorithm for rendering spans with priority-based occlusion

```
            }
            else if (spanEdgeNext.m_priority > activeSpanEdge.m_priority)
            {
                // The current active span is being obscured by
                // the leading edge of a new span
                Rasterize span between activeSpanEdge and spanEdgeNext;
                activeFlags[spanEdgeNext.activeIndex] = true; // Necessary?
                spanActiveEdges.push(activeSpanEdge);
                activeSpanEdge = spanEdgeNext;
            }
            else
            {
                // The new edge is lower priority
                // than the currently visible surface
                if (spanEdgeNext is a leading edge for a span)
                {
                    // Add the edge to the stack and sort by priority
                    spanActiveEdges.push(spanEdgeNext);
                }
                else
                {
                    // This is a trailing edge hidden by the nearer surface
                    // The leading edge corresponding to this
                    // trailing edge could be removed from the active edge list
                    // However this would take linear time so instead mark
                    // the edge as no-longer active
                    activeFlags[spanEdgeNext.activeIndex] = false;
                }
            }
        }
    }
}
```

In this example, Pseudo-code 5 includes a step in which a span is rasterized between two span edges. In this example, rasterization is done into an additive buffer. As noted above, in some embodiments, anti-aliasing may be achieved for fractional sample width fragments by scaling them by the fraction of the sample covered. Such embodiments may exploit the fact that the method results in correct visibility and clipping, so exact coverage may be computed analytically. An alternative embodiment may include super-sampling along the cross-section, but this may require more shading and rasterization computation than the analytic method.

Figure 4:
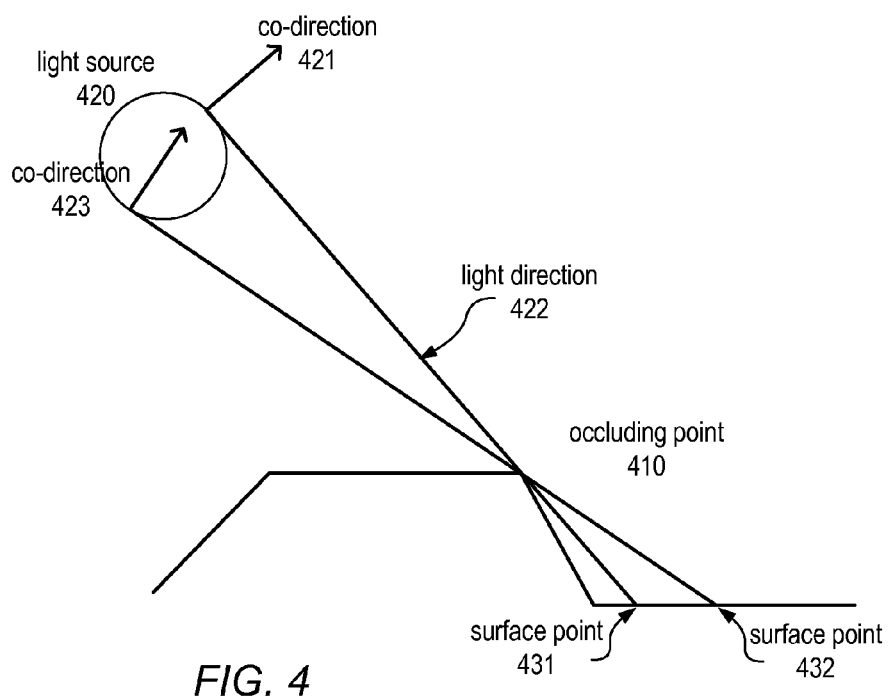
FIG. 4 illustrates geometry for a height-field with a linear light source, shown in cross-section, according to one embodiment.

In some embodiments, the details of rasterization and shading may depend on the type of 3D interior geometry that is being rendered. Referring to FIG. 4, it is worth noting that the first ray-surface intersection for the ray corresponding to co-direction 421 will mark the end of the umbra region for the span. (In the case where the span is not occluded, this position will be to the left of the leading edge of the span). This observation may in some embodiments be used to optimize rasterization. For example, a ray may be generated that corresponds to the maximum co-direction 421 dot product value from previous spans in the cross-section using Equation 4.

$$r_{Origin} = d_{coDirection} P_{Max} + (V_{Origin} \cdot S) S \qquad (4)$$

In this equation, $r_{Origin}$ represents the ray origin, $d_{coDirection}$ represents the co-direction vector, $P_{Max}$ represents the maximum value of the co-direction vector and all positions closer to the light source along the cross-section, and S represents a normalized vector orthogonal to Z and the span-vector sweep direction. In this example, the horizontal position along the scan-vector marks the first possible lit point. For samples to the left of that position, a direct scan-conversion of ambiently lit geometry may be rasterized using a special-case rasterizer, in some embodiments.

For a planar 3D fill style, i.e. planar shape, the intersection of the ray for co-direction 423 may be computed. Between those two intersection points, the full convex-hull updating algorithm may be computed, as described above. Beyond the penumbra/lit boundary, full shading without convex-hull updating may be computed all the way to the terminating edge of the span. At that terminating edge, a single point may then be used to update the convex hull, to prepare it for subsequent spans onto which it may cast shadows.

For non-planar surfaces, a more general algorithm may be required. Special-case rasterization of the umbra may be followed by shading using the full convex-hull updating algorithm. However, for some concave 3D shapes that are self-shadowing, this may create aliasing artifacts, since shading computations are only performed on regular sample positions within a span beyond the umbra/penumbra boundary. To have a truly robust solution, it may be necessary to determine when a sub-span crosses an outline, from the point of view of the light, and to cast new rays from there. For surfaces that are convex in cross section, such silhouette detection may not be required, provided that their radius of curvature is large compared to the sampling grid.

Span Vector Re-Sampling Strategies

Figure 11:
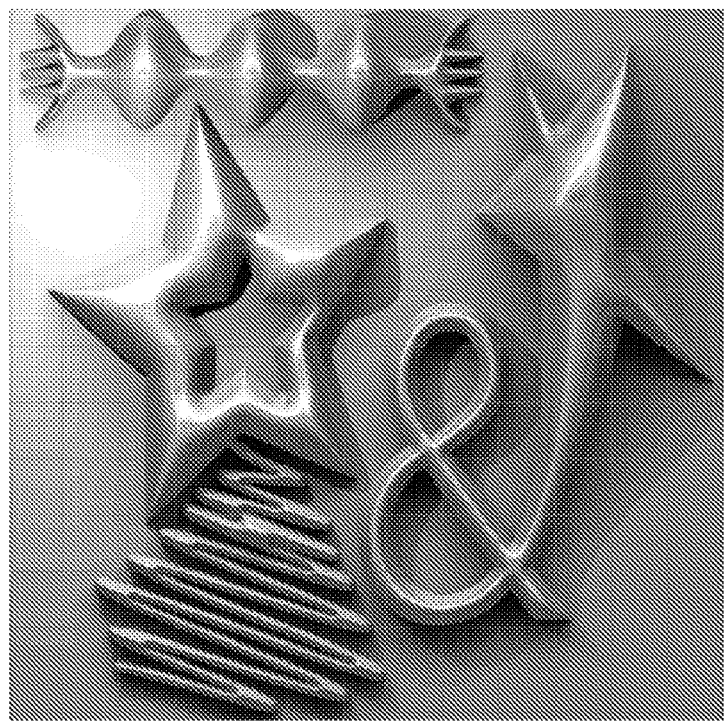
FIG. 11 illustrates a height-field shaded with a point light source via a radial sweep, according to one embodiment.

Various scan-vector based methods are presented above for effective shadow computations provided that the scan-vectors are aligned with the light direction. In the case of distant lights, however, where all of the light rays are parallel, the creation of images may in some embodiments be done on a regular array of parallel scan-vectors. In order to re-sample points located along such scan-vectors, it may be possible to add bilinear splats or other kernels into an additive image buffer as was previously mentioned. Such an approach was used for rendering the images illustrated in FIGS. 1 and 2. However, there may be a high computational cost to such an approach, both because bilinear or kernel based splatting may be more expensive than simple pixel writes, and because the additive target image may not be accessed in a cache-coherent manner, when the light direction is not axis aligned. However, the approach may also be extended to point light sources, for radially arranged scan-vectors. One example of a height-field shaded with a point light source via radial sweep rendering is illustrated in FIG. 11. In such cases, each of the bilinear splats may be weighted by the area of the samples that they represent. The effect of a point light source is shown added to a scaled version of the environment lighting from FIG. 2. For this example, updating the point lighting portion of the calculation was performed at 4.5 fps on a four core Xeon 2.4 GHz at 1024×1024.

Figure 12:
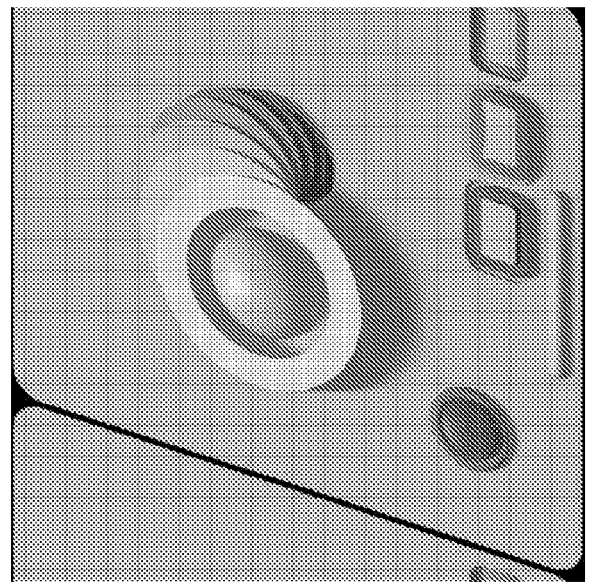
FIG. 12 illustrates a sheared geometry rasterized such that light propagation is along the X-axis, according to one embodiment.

In the case of parallel illumination, an alternative embodiment may include rotating the geometry and lights so that the light direction is aligned with the target image scan-lines, rasterizing the shape in horizontal sweeps, and finally rotating the intermediate image back to the original orientation. This approach may be effective at simplifying pixel re-sampling, but may include the additional cost of the image rotation. The intermediate image memory requirement may also be twice that of the original image for adequate sampling. A modified version of this approach may include applying a vertical shear to the geometry such that the rendered intermediate image only needs a second vertical shear (back the other way). This approach may make the subsequent re-sampling more efficient, since linear rather than bilinear interpolation is sufficient, and the intermediate buffer may only need to be the same resolution (plus two scan-lines) as the final output image. One such shear warped intermediate result is shown in FIG. 12. In this example, a sheared geometry is rasterized such that light propagation is along the X-axis. In this example, the shear-warp approach was found to be up to twice as fast as the bilinear splat algorithm for off-axis light directions with simple shading.

Figure 13:
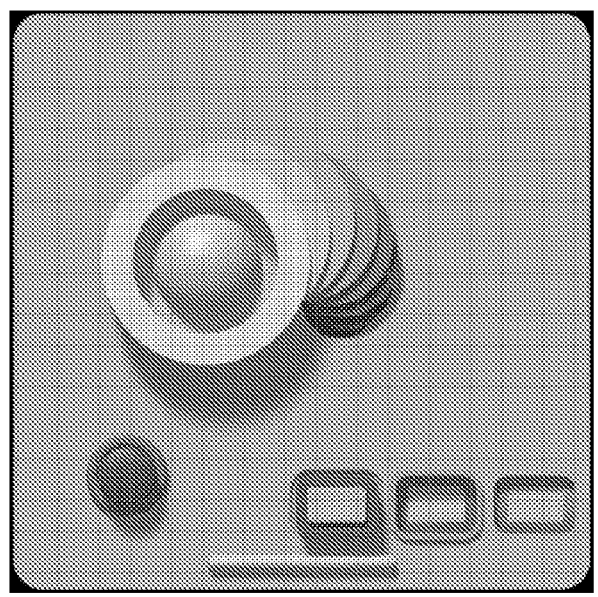
FIG. 13 illustrates an image created using sixteen linear light sources to approximate an area light, according to one embodiment.

As noted above, in some embodiments a series of linear lights may be added together to create the visual effect of an area light. This may require computing the algorithm N times and summing the result. For example, FIG. 13 illustrates an image created using sixteen linear light sources to approximate an area light source.

In embodiments in which a full angular sweep of area lights is used to approximate an environment map, it is worth noting that a given scan-vector may be used to compute two linear lights, for each direction of sweep. In such embodiments, the span-geometry intersections and span sorting may only need to be computed once, but the rasterization may be done twice, once for each direction, to maintain causality of the self-occlusion of the height-field. The cost of a subsequent image shear may also be amortized over two illumination directions, in some embodiments.

In some embodiments, sorting may be done by scan line, and then each object may be rasterized as that sorted scan line set is encountered in the sorted list.

In another embodiment, the method may involve super sampling in both directions and only writing samples at whole pixel locations. In such embodiments, the method may include a depth priority z-buffering algorithm. The shadow sweep may still be performed in such embodiments, but it may be touching more samples (e.g., because it would be super sampling everywhere), rather than doing fractional anti-aliasing at the edges. Such an embodiment may be well suited for implementation on a GPU because each object may be handled in turn, rather than handling each scan line in turn and then sorting the results. In other words, the method may involve rasterizing the depth into an image that is super sampled in both directions, then for each scan line in the image, a sweep may be used to look at samples, compute the shadows, and do the shading, as described herein. In such embodiments, fractional anti-aliasing may not be needed (but it may be more efficient on a CPU).

Note that the techniques described herein may in some embodiments be used on shapes with depth. For example, if the shape includes just one square, with a depth for each point, the methods described herein may be used to compute shadows (e.g., resulting from the depth map). In some embodiments, the methods described herein may be suitable for including titling on videos, or may be generally applicable to any vector imaging application.

Note also that the techniques described herein may in some embodiments be used as part of a hybrid rendering methodology. For example, they may be used to compute shadows for one or more image(s), as described herein, while a ray tracer may be used to compute reflections from the material.

The methods described herein may in some embodiments be implemented as program instructions stored in a memory and coded to run in parallel (e.g., on one or more multiprocessors) and/or coded to run on a GPU (e.g., using suitable APIs, such as the OpenGL API). For example, the techniques may be applied to strips of an image independently, and/or the rendering of images including shadowing may be broken up into smaller problems for parallel (e.g., multi-core) execution. In various embodiments, the methods may be mapped to classic 3D rendering APIs that run on currently available GPUs, or may be written using an advanced Compute Unified Device Architecture (CUDA®) technology or in a proprietary language that includes ways to access blocks of pixels.

Figure 14:
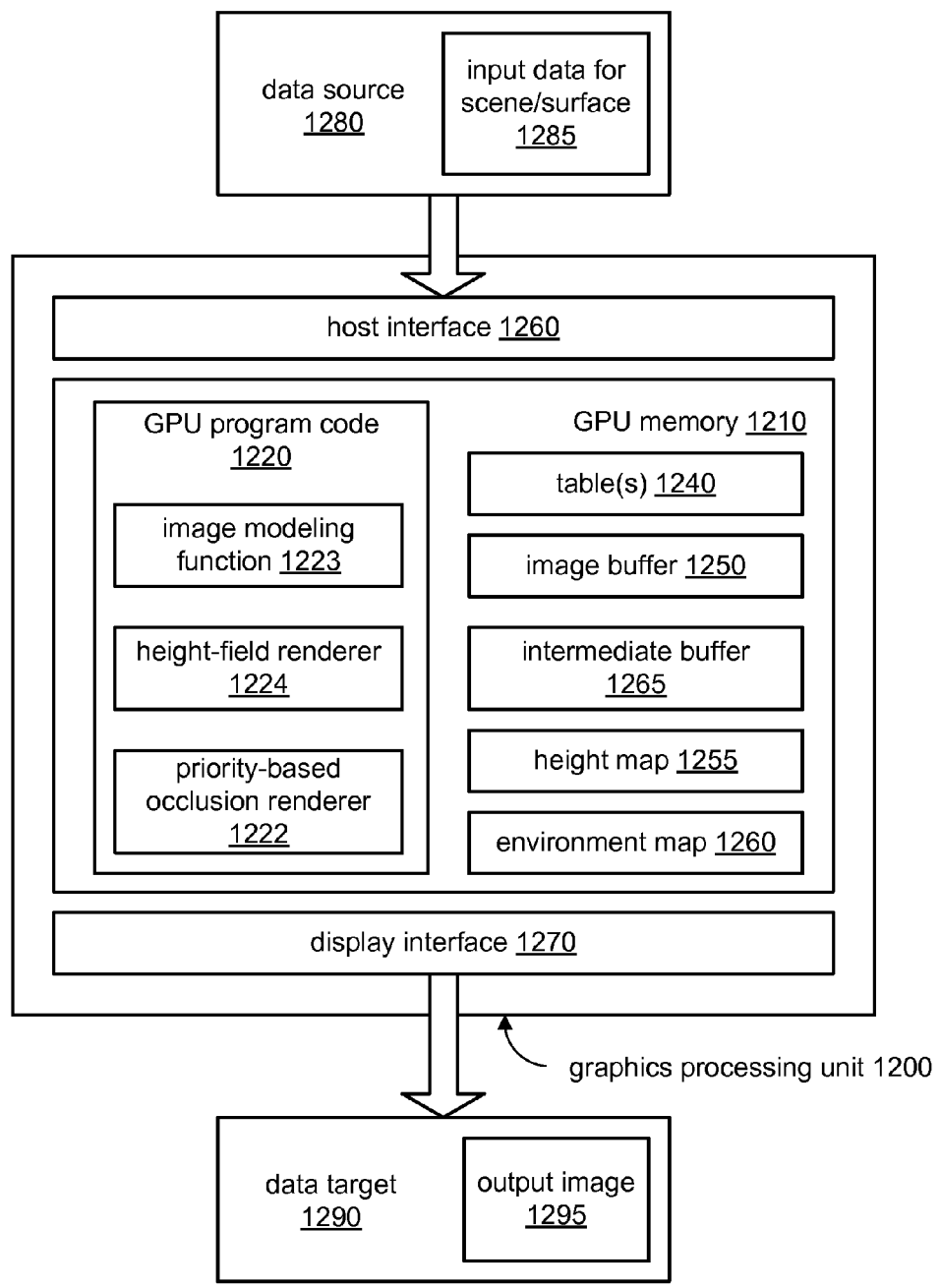
FIG. 14 is a block diagram illustrating one embodiment of a graphics processing unit (GPU) configured for rendering height-fields with hard and soft shadows.
Figure 15:
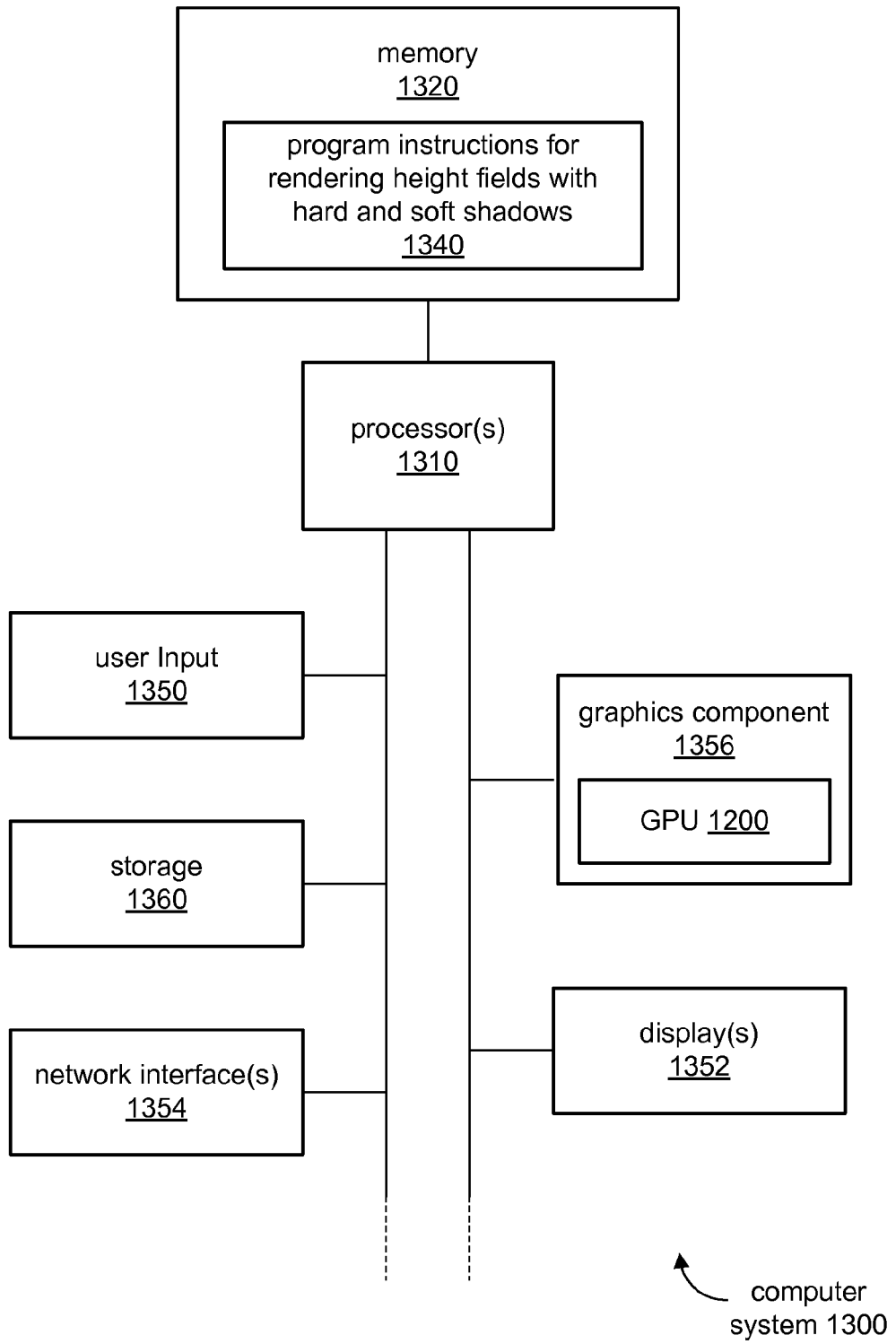
FIG. 15 is a block diagram illustrating constituent elements of a computer system that is configured to implement embodiments of the system and method for rendering height-fields with hard and soft shadows.

The methods described herein for efficiently rendering height-fields with hard and soft shadows may be implemented using modern graphics hardware, such as a graphics processing unit, or GPU. FIG. 14 is a block diagram illustrating one embodiment of a GPU 1200 configured for rendering such scenes. The GPU 1200 may comprise a dedicated graphics rendering device associated with a computer system. An example of a suitable computer system 1300 for use with a GPU is illustrated in FIG. 15. The GPU 1200 illustrated in FIG. 14 may include numerous specialized components configured to optimize the speed of rendering graphics output. For example, the GPU 1200 may include specialized components for rendering three-dimensional models, for applying textures to surfaces, etc. For the sake of illustration, however, only a limited selection of components is shown in the example GPU 1200 of FIG. 14. It is contemplated that GPU architectures other than the example architecture of FIG. 14 may be suitable for implementing the techniques described herein. The GPU 1200 may implement one or more application programmer interfaces (APIs) that permit programmers to invoke the functionality of the GPU. Suitable GPUs may be commercially available from vendors such as NVIDIA Corporation, ATI Technologies, and others.

The GPU 1200 may include a host interface 1260 configured to communicate with a data source 1280 (e.g., a communications bus and/or processor(s) 910 of a host computer system 900, or the host system itself). For example, the data source 1280 may provide input data (e.g., a scene comprising one or more geometric objects including one or more surfaces having depth) and/or executable program code to the GPU 1200. In some embodiments, the host interface 1260 may permit the movement of data in both directions between the GPU 1200 and the data source 1280. The GPU 1200 may also include a display interface 1270 for providing output data to a data target 1290. For example, the data target 1290 may comprise a display device 1352, and the GPU 1200 (along with other graphics components and/or interfaces 1356) may "drive" the display 1352 by providing graphics data at a particular rate from a screen buffer (e.g., the image buffer 1250).

In one embodiment, the GPU 1200 may include internal memory 1210. The GPU memory 1210, also referred to herein as "video memory" or "VRAM," may comprise random-access memory (RAM) which is accessible to other GPU components. As will be described in greater detail below, the GPU memory 1210 may be used in some embodiments to store various types of data and instructions such as input data, output data, intermediate data, program instructions for performing various tasks, etc. In one embodiment, the GPU 1200 may also be configured to access memory 1320 of a host computer system 1300 via the host interface 1260.

In one embodiment, program instructions 1340 may be stored in the memory 1320 of the host computer system 1300 and executed by the host computer system 1300 to generate output image 1295 based on input data 1285. Input data 1285 may include data representing a scene comprising one or more geometric objects having one or more surfaces that include depth and/or depth discontinuities, as described herein.

In one embodiment, the GPU 1200 may include GPU program code 1220 that is executable by the GPU 100 to perform aspects of the techniques discussed herein. For example, the geometric objects in the input 1285 may be rasterized to pixels during a rendering process including execution of the GPU program code 1220 on the GPU 1200. Elements of the GPU program code 1220 may be provided to the GPU 1200 by a host computer system (e.g., the data source 1280) and/or native to the GPU 1200. In one embodiment, the GPU program code 1220 may comprise one or more shaders, blending functions, or peeling functions (not shown). In generating the output image 1295, any of these functions, or other functions included in GPU program code 1220, may be executed at various points in the graphics pipeline.

The GPU memory 1200 may comprise one or more buffers, and each buffer may comprise a two-dimensional array of pixel data (e.g., color values) and/or pixel metadata (e.g., depth values, stencil values, etc.). As illustrated in FIG. 14, for example, the GPU memory 1210 may comprise an image buffer 1250. The image buffer 1250 may store intermediate or final pixel values generated in the rendering process. In one embodiment, the image buffer 1250 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In another embodiment, the image buffer 1250 may comprise a multi-sampling buffer usable for automatic anti-aliasing.

As illustrated in FIG. 14, the GPU memory 1210 may comprise various other data structures such table(s) 1240, an intermediate buffer 1265, a height map 1255, and an environment map 1260, as described herein. For example, table(s) 1240 may in various embodiments include one or more data structures configured to store samples of an incremental convex hull, and/or one or more data structures configured to store pre-computed integrals for various light direction components, as described herein. In one embodiment, the image buffer 1250 may be the same resolution as the target resolution of the data target 1290. The image buffer 1250 may comprise a screen buffer, which is provided directly to the data target 1290. In one embodiment, the image buffer 1250 and the height map 1255 may be the same resolution, and each location (i.e., a pixel) in the image buffer may correspond to a respective location in the height map 1255. Each value stored in the height map 1255 may indicate a relative height or distance of the corresponding pixel from a reference point.

The GPU 1200 may include various built-in functions to assist in the rendering of artwork. In one embodiment, the GPU 1200 may include a Z-test and/or a stencil test function (not shown). Functions such as the Z-test and stencil test may be enabled, disabled, and/or otherwise configured through invocation of appropriate functions in the GPU API and/or by operation of the anti-aliasing code within program code 1220.

Program code 1220 may include an image modeling function 1223, a basic or extended height-field rendered 1224 and/or a priority-based occlusion renderer 1222, as described herein. In some embodiments, these functions may include program instructions executable by the GPU to implement the methods described herein for efficiently and correctly rendering height fields with soft and hard shadows. In other embodiments, program instructions 1340 (shown in FIG. 15) may be used to implement these methods. In still other embodiments, the operations of a graphics application, including some of those described herein for rendering height-fields with hard and soft shadows, may be divided between one or more CPUs and/or GPUs for execution. For example, the computations to determine the rendering parameters may be simpler on the CPU, and fewer instructions may be used in a pixel shader on the GPU. Furthermore, the computation in the GPU and/or CPU may be more robust for particular calculations performed by a graphics application. Various embodiments may be chosen to match the capabilities of a particular GPU 1200 (e.g., the GPU 1200 may lack a priority-based occlusion renderer 1222 or other component illustrated in FIG. 14).

FIG. 15 is a block diagram illustrating constituent elements of an exemplary computer system 1300 that is configured to implement embodiments of the system and method for rendering height-fields with hard and soft shadows, as described herein. The computer system 1300 may include one or more processors 1310 implemented using any desired architecture or chip set, such as the SPARC™ architecture, an x86-compatible architecture from Intel Corporation or Advanced Micro Devices, or another architecture or chipset capable of processing data. Any desired operating system(s) may be run on the computer system 1300, such as various versions of Unix, Linux, Windows® from Microsoft Corporation, MacOS® from Apple Inc., or any other operating system that enables the operation of software on a hardware platform. The processor(s) 1310 may be coupled to one or more of the other illustrated components, such as a memory 1320, by at least one communications bus.

In one embodiment, a specialized graphics card or other graphics component 1356 may be coupled to the processor(s) 1310. The graphics component 1356 may include a GPU such as the GPU 1200 illustrated in FIG. 14. Additionally, the computer system 1300 may include one or more imaging devices 1352. The one or more imaging devices 1352 may include various types of raster-based imaging devices such as monitors and printers. In one embodiment, one or more display devices 1352 may be coupled to the graphics component 1356 for display of data provided by the graphics component 1356.

In one embodiment, program instructions 1340 that may be executable by the processor(s) 1310 to implement aspects of the techniques described herein may be partly or fully resident within the memory 1320 at the computer system 1300 at any point in time. The memory 1320 may be implemented using any appropriate medium such as any of various types of ROM or RAM (e.g., DRAM, SDRAM, RDRAM, SRAM, etc.), or combinations thereof. The program instructions may also be stored on a storage device 1360 accessible from the processor(s) 1310. Any of a variety of storage devices 1360 may be used to store the program instructions 1340 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1360 may be coupled to the processor(s) 1310 through one or more storage or I/O interfaces. In some embodiments, the program instructions 1340 may be provided to the computer system 1300 via any suitable computer-readable storage medium including the memory 1320 and storage devices 1360 described above.

The computer system 1300 may also include one or more additional I/O interfaces, such as interfaces for one or more user input devices 1350. In addition, the computer system 1300 may include one or more network interfaces 1354 providing access to a network. It should be noted that one or more components of the computer system 1300 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 1300 can also include numerous elements not shown in FIG. 15, as illustrated by the ellipsis shown.

In various embodiments, the operations illustrated in FIGS. 5-8 and 10 may be performed in a different order than the illustrated order. In general, any of the operations described in the elements of these figures may be performed programmatically (i.e., by a computer according to a computer program). In FIGS. 5-8 and 10, any of the operations described in the elements may be performed automatically (i.e., without user intervention), in various embodiments.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method comprising:
   determining a point of maximum elevation from a given position of a surface, wherein the point of maximum elevation comprises a point for which the measure of an angle of a line from the given position of the surface to the point relative to the horizon has a maximum value;
   computing an amount of light falling on the given position of the surface from a given light source; and
   rendering a height-field image with shadowing dependent, at least in part, on said determining and said computing.

2. The method of claim 1, wherein the surface is modeled by a 2.5 dimensional (2.5D) representation comprising a two-dimensional (2D) boundary shape and a three-dimensional (3D) fill style.

3. The method of claim 2,
   wherein the 3D fill style is represented by a 3D surface that comprises a normal and a depth for each point within the 2D boundary shape; and
   wherein the depth is usable in determining casting and receipt of shadows on the surface.

4. The method of claim 1, wherein said computing comprises determining occlusion of the light source by other portions of the surface.

5. The method of claim 1, wherein said rendering comprises re-sampling using a sweep across one or more diagonal height-field cross-sections in a direction away from and orthogonal to the light source.

6. The method of claim 1, wherein the light source comprises a linear light source.

7. The method of claim 6, wherein said rendering comprises re-sampling using radial sweeps for the linear light source.

8. The method of claim 1, wherein the light source comprises a plurality of linear light sources modulated by an environment map.

9. The method of claim 1, wherein said rendering comprises re-sampling using a shear-warp technique.

10. The method of claim 1,
    wherein a representation of the surface comprises a 2D boundary shape and occlusion priority information, and
    wherein the 2D boundary shape and the occlusion priority are usable in determining visibility of the surface shape independent of depth of the surface.

11. The method of claim 1, wherein said computing comprises determining occlusion of the light source by one or more other surfaces in a same scene as the surface.

12. The method of claim 1, wherein said determining comprises iteratively searching points of a convex hull of previous points in a scan-line that includes the given surface position.

13. The method of claim 1, wherein said computing comprises computing a weighted integral over a visible portion of the light source.

14. The method of claim 1, wherein said computing comprises using a pre-computed weighted integral over a visible portion of the light source to compute the amount of light dependent on a horizon angle between the given surface position and the point of maximum elevation.

15. The method of claim 1, further comprising:
  computing one or more bounding edges as intersections of 2D light-aligned scan vectors and 2D bounding shapes of each element of a scene, wherein the scene comprises the surface;
  wherein said rendering comprises:
    sorting the bounding edges in order of increasing distance from the light source along the corresponding scan vector; and
    rasterizing a span having a highest occlusion priority.

16. A computer-readable storage medium storing program instructions,
  wherein the program instructions are computer-executable to implement a height-field renderer, configured to:
    determine a point of maximum elevation from a given position of a surface, wherein the point of maximum elevation comprises a point for which the measure of an angle of a line from the given position of the surface to the point relative to the horizon has a maximum value;
    compute an amount of light falling on the given position of the surface from a given light source; and
    render a height-field image with shadowing dependent, at least in part, on said determining and said computing.

17. The storage medium of claim 16, wherein the surface is modeled by a 2.5 dimensional (2.5D) representation comprising a two-dimensional (2D) boundary shape and a three-dimensional (3D) fill style.

18. The storage medium of claim 17,
  wherein the 3D fill style is represented by a 3D surface that comprises a normal and a depth for each point within the 2D boundary shape; and
  wherein the depth is usable in determining casting and receipt of shadows on the surface.

19. The storage medium of claim 16, wherein said computing comprises determining occlusion of the light source by one or more of: another portion of the surface or another surfaces in a same scene as the surface.

20. The storage medium of claim 16, wherein said rendering comprises re-sampling using a sweep across one or more diagonal height-field cross-sections in a direction away from and orthogonal to the light source.

21. The storage medium of claim 16,
  wherein the light source comprises a linear light source; and
  wherein said rendering comprises re-sampling using radial sweeps for the linear light source.

22. The storage medium of claim 16, wherein said rendering comprises re-sampling using a shear-warp technique.

23. The storage medium of claim 16,
  wherein a representation of the surface comprises a 2D boundary shape and occlusion priority information, and
  wherein the 2D boundary shape and the occlusion priority are usable in determining visibility of the surface shape independent of depth of the surface.

24. The storage medium of claim 16, wherein said determining comprises iteratively searching points of a convex hull of previous points in a scan-line that includes the given surface position.

25. The storage medium of claim 16, wherein said computing comprises using a pre-computed weighted integral over a visible portion of the light source to compute the amount of light dependent on a horizon angle between the given surface position and the point of maximum elevation.

26. The storage medium of claim 16, wherein the program instructions are further computer-executable to implement:
  computing one or more bounding edges as intersections of 2D light-aligned scan vectors and 2D bounding shapes of each element of a scene, wherein the scene comprises the surface;
  wherein said rendering comprises:
    sorting the bounding edges in order of increasing distance from the light source along the corresponding scan vector; and
    rasterizing a span having a highest occlusion priority.

27. A system, comprising:
  one or more processors; and
  a memory coupled to the one or more processors;
  wherein the memory stores program instructions executable by the one or more processors to implement a height-field renderer, configured to:
    determine a point of maximum elevation from a given position of a surface, wherein the point of maximum elevation comprises a point for which the measure of an angle of a line from the given position of the surface to the point relative to the horizon has a maximum value;
    compute an amount of light falling on the given position of the surface from a given light source; and
    render a height-field image with shadowing dependent, at least in part, on said determining and said computing.

28. The system of claim 27, wherein the surface is modeled by a 2.5 dimensional (2.5D) representation comprising a two-dimensional (2D) boundary shape and a three-dimensional (3D) fill style.

29. The system of claim 28,
  wherein the 3D fill style is represented by a 3D surface that comprises a normal and a depth for each point within the 2D boundary shape; and
  wherein the depth is usable in determining casting and receipt of shadows on the surface.

30. The system of claim 27, wherein said computing comprises determining occlusion of the light source by one or more of: another portion of the surface or another surfaces in a same scene as the surface.

31. The system of claim 27, wherein said rendering comprises re-sampling using a sweep across one or more diagonal height-field cross-sections in a direction away from and orthogonal to the light source.

32. The system of claim 27,
  wherein the light source comprises a linear light source; and
  wherein said rendering comprises re-sampling using radial sweeps for the linear light source.

33. The system of claim 27,
  wherein a representation of the surface comprises a 2D boundary shape and occlusion priority information, and
  wherein the 2D boundary shape and the occlusion priority are usable in determining visibility of the surface shape independent of depth of the surface.

34. The system of claim 27, wherein said determining comprises iteratively searching points of a convex hull of previous points in a scan-line that includes the given surface position.

35. The system of claim 27, wherein said computing comprises using a pre-computed weighted integral over a visible portion of the light source to compute the amount of light dependent on a horizon angle between the given surface position and the point of maximum elevation.

36. The system of claim 27, wherein the program instructions are further computer-executable to implement:
  computing one or more bounding edges as intersections of 2D light-aligned scan vectors and 2D bounding shapes of each element of a scene, wherein the scene comprises the surface;
  wherein said rendering comprises:
    sorting the bounding edges in order of increasing distance from the light source along the corresponding scan vector; and
    rasterizing a span having a highest occlusion priority.

37. The system of claim 27, wherein the one or more processors comprise at least one graphics processing unit (GPU).

38. A computer-implemented method comprising:
  modeling a surface of an element in a scene using a 2.5 dimensional (2.5D) representation comprising a two-dimensional (2D) boundary shape and a three-dimensional (3D) fill style;
  determining a point of maximum elevation from a given position of the surface, wherein the point of maximum elevation comprises a point for which the measure of an angle of a line from the given position of the surface to the point relative to the horizon has a maximum value;
  computing an amount of light falling on the given surface position from a given light source; and
  rendering a height-field image with shadowing dependent, at least in part, on said determining and said computing;
  wherein said computing comprises determining occlusion of the light source by one or more of: another portion of the surface or another element in the scene.

39. The method of claim 38,
  wherein the 3D fill style is represented by a 3D surface that comprises a normal and a depth for each point within the 2D boundary shape; and
  wherein the depth is usable in determining casting and receipt of shadows on the surface.

40. The method of claim 38,
  wherein the 2.5D representation further comprises occlusion priority information, and
  wherein the 2D boundary shape and the occlusion priority are usable in determining visibility of the surface shape independent of depth of the surface.

* * * * *